(12) United States Patent
Bellomare et al.

(10) Patent No.: US 11,985,989 B2
(45) Date of Patent: May 21, 2024

(54) MACHINE FOR THE PRODUCTION OF ICE CREAM

(71) Applicant: DE'LONGHI APPLIANCES S.R.L. CON UNICO SOCIO, Treviso (IT)

(72) Inventors: Filippo Bellomare, Treviso (IT); Alessandro Benedetti, Treviso (IT); Andrea Moro, Treviso (IT)

( * ) Notice: Subject to any disclaimer, the term of this patent is extended or adjusted under 35 U.S.C. 154(b) by 792 days.

(21) Appl. No.: 17/058,647

(22) PCT Filed: May 24, 2019

(86) PCT No.: PCT/IT2019/050118
§ 371 (c)(1),
(2) Date: Nov. 24, 2020

(87) PCT Pub. No.: WO2019/224859
PCT Pub. Date: Nov. 28, 2019

(65) Prior Publication Data
US 2021/0204564 A1    Jul. 8, 2021

(30) Foreign Application Priority Data
May 24, 2018  (IT) ........................ 102018000005681

(51) Int. Cl.
*A23G 9/12* (2006.01)
*A23G 9/22* (2006.01)
*A23G 9/28* (2006.01)

(52) U.S. Cl.
CPC .............. *A23G 9/281* (2013.01); *A23G 9/12* (2013.01); *A23G 9/228* (2013.01)

(58) Field of Classification Search
CPC . A23G 9/12; A23G 9/228; A23G 9/28; A23G 9/281
See application file for complete search history.

(56) References Cited

U.S. PATENT DOCUMENTS

| | | | | | |
|---|---|---|---|---|---|
| 115,657 | A | * | 6/1871 | Tingley | .................... A23G 9/12 |
| 683,791 | A | * | 10/1901 | Perkins | .................... A23G 9/12 |
| 2,779,167 | A | * | 1/1957 | Lo Faro | .................... A23G 9/12 62/343 |
| 4,538,427 | A | * | 9/1985 | Cavalli | .................... A23G 9/12 165/46 |
| 4,736,600 | A | * | 4/1988 | Brown | .................... A23G 9/12 366/186 |

(Continued)

FOREIGN PATENT DOCUMENTS

| | | |
|---|---|---|
| CN | 201 345 883 Y | 11/2009 |
| EP | 0 496 441 A1 | 7/1992 |
| EP | 2 708 142 A1 | 3/2014 |

OTHER PUBLICATIONS

International Search Report and Written Opinion for PCT/IT2019/050118, dated Aug. 30, 2019.

*Primary Examiner* — Reginald Alexander
(74) *Attorney, Agent, or Firm* — MARSHALL, GERSTEIN & BORUN LLP

(57) ABSTRACT

A machine for the production of ice cream includes a support body defining a housing compartment, a tub configured to contain the ingredients for the preparation of the ice cream which can be removably inserted in said housing compartment, a cooling circuit, a mixing device configured to mix the ingredients during the ice cream preparation process, a lid and clamping devices.

17 Claims, 3 Drawing Sheets

(56) References Cited

U.S. PATENT DOCUMENTS

| | | | | |
|---|---|---|---|---|
| 5,363,746 A | * | 11/1994 | Gordon | A23G 9/12 |
| | | | | 366/601 |
| 6,817,203 B1 | * | 11/2004 | Rischewski | A23G 9/163 |
| | | | | 366/195 |
| 2019/0373913 A1 | * | 12/2019 | Velez | A23G 9/228 |

* cited by examiner

MACHINE FOR THE PRODUCTION OF ICE CREAM

FIELD OF THE INVENTION

The present invention concerns a machine for the production of ice cream, of the type usable in a domestic or semi-professional environment.

BACKGROUND OF THE INVENTION

Substantially automatic machines for the production of ice cream in a domestic and/or professional environment are known.

Known machines generally comprise a support body in which a container, or tub, is disposed, in which the ingredients required to prepare the ice cream can be introduced and worked.

A mixing device is disposed inside the container with a normally vertical axial shaft which is rotated by a motorized drive mechanism to mix the ingredients during the ice cream production process.

Known machines generally also comprise a covering device, associated at the upper part of the support body, and suitable to cover, during use, the support body and the container in which the ingredients are contained.

The machine also comprises a cooling circuit by means of which the walls of the container, and therefore the ingredients therein, are brought to the temperature suitable to form the ice cream.

The cooling circuit normally comprises an evaporator device, a condenser, a compressor and an expansion member, through which a heat transfer fluid flows, which is condensed and evaporated cyclically.

In order to perform the process, a preparation and/or the ingredients necessary to produce the ice cream, and a liquid, for example water, milk or other, are normally disposed inside the container.

The ingredients, once inserted, begin to cool and are mixed and homogenized by the mixing device.

The machine can also comprise a timing mechanism to set and/or pre-memorize the mixing times necessary to obtain the ice cream according to the modalities required by the type of preparation.

The mixing of the preparation and the liquid, together with the low temperature induced by the cooled walls, facilitates the reaction that forms the ice cream until it is ready for consumption.

At the end of the ice cream production process, the mixture obtained is removed from the container using spatulas or similar tools.

A first disadvantage of known machines is that they do not allow an adequate and efficient heat transfer between the cooling circuit and the container in which the ingredients are disposed, so that they require long times for the preparation of the ice cream.

Another disadvantage of known machines is the fact that they present problems with cleaning the various components, since, in addition to the container for the ingredients, the support body can also become dirty during the introduction of the ingredients, during the production of the ice cream or also during its extraction.

The rotation of the mixing device, in fact, often causes splashes of the mixture to exit the container which can deposit on the support body.

A further disadvantage of the machines of the known type is that they do not allow an easy extraction of the ice cream.

A further disadvantage is that the container in which the ingredients are contained is easily accessible by a user even during the functioning of the machine itself, causing safety problems for users who could be injured due to contact with rotating parts of the mixing device.

One purpose of the present invention is to provide a machine for the production of ice cream which overcomes at least some of the disadvantages of the state of the art.

Another purpose of the present invention is to provide a machine for the production of ice cream that is efficient in terms of heat transfer and cooling of the ingredients, allowing to reduce the times generally required to prepare the ice cream.

In particular, one purpose of the present invention is to provide an ice cream machine that is easy to clean.

A further purpose is to provide an ice cream machine that requires minimal cleaning interventions.

Another purpose of the present invention is to provide an ice cream machine which allows an automatic removal of the ice cream, as well as facilitating and speeding up both the steps of loading the ingredients and also those of extracting the finished product.

Another purpose of the present invention is to provide a machine for the production of ice cream that is safe for a user.

Another purpose is to allow multiple use of the container, for example for preserving and consuming the ice cream.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a machine for the production of ice cream comprises a support body defining a housing compartment with a substantially horizontal axis of development, and a container, or tub, to contain the ingredients to prepare the ice cream which can be removably inserted in the housing compartment.

By "substantially horizontal" we mean that the axis of development is horizontal, or slightly inclined with respect to a horizontal plane, for example at an angle of inclination of no more than 20°.

The machine for the production of ice cream also comprises a cooling circuit configured to cool the housing compartment and the tub disposed therein, and a mixing device disposed, during use, inside the tub and configured to mix the ingredients during the ice cream preparation process.

In particular, the mixing device is configured to remove the cooled mixture which forms on the lateral walls of the tub in contact with the cooling circuit, so as to obtain a homogeneous mixture and at the same time incorporate air therein.

According to some embodiments, the machine comprises a lid configured to selectively close an upper aperture of the tub. In particular, the lid can be coupled with the tub so as to form a cartridge-type container with it.

By cartridge-type container we mean a container suitable to contain ingredients and/or liquid, semi-liquid and dense substances, which can be closed and can be transported and handled in an assembled condition and autonomously, as if it were a single entity.

In this way, it is possible to introduce the ingredients into the cartridge-type container away from the machine, close it with the lid, and then insert it into the housing compartment, so as to reduce the operations required to clean the machine to a minimum.

It is also possible to remove the container associated with its lid from the machine, for example in order to preserve the ice cream produced in a refrigerator before consuming it.

It is also possible to use the container to serve the ice cream and/or to transport it to the place of consumption.

According to some embodiments, the machine also comprises clamping devices provided on the support body and configured to selectively clamp the lid and the container in the housing compartment.

According to some embodiments, the housing compartment and the container have truncated cone shapes mating with each other with the same angle of flare. The truncated cone shape allows to insert and remove the tub simply and quickly into/from the housing compartment and at the same time guarantees a correct positioning and a high surface adherence of the two components. In this way, the heat exchange between the housing compartment and the tub is also increased, increasing the overall efficiency of the machine.

According to some embodiments, the lid is provided with at least one through aperture through which the ice cream produced can be delivered, and with a closing member selectively drivable to open or close the through aperture. In this way, it is possible to remove the ice cream from the container without dirtying the machine, and possibly pour the product already divided into portions ready for consumption.

According to further embodiments, the clamping devices comprise a constraint element selectively mobile between a position of non-interference, distant from the lid, in which it allows the insertion and removal of the latter, and possibly of the container associated therewith, and a position of interference in which it is in contact with the lid and prevents its removal.

According to further embodiments, the machine also comprises switch devices, associated with the clamping devices, and configured to act on a motor member connected to the mixing device to stop the rotation thereof if the lid is removed. In this way, if a user opens the lid when the machine is functioning, there is no risk of injury caused by components rotating at high speeds.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 2:
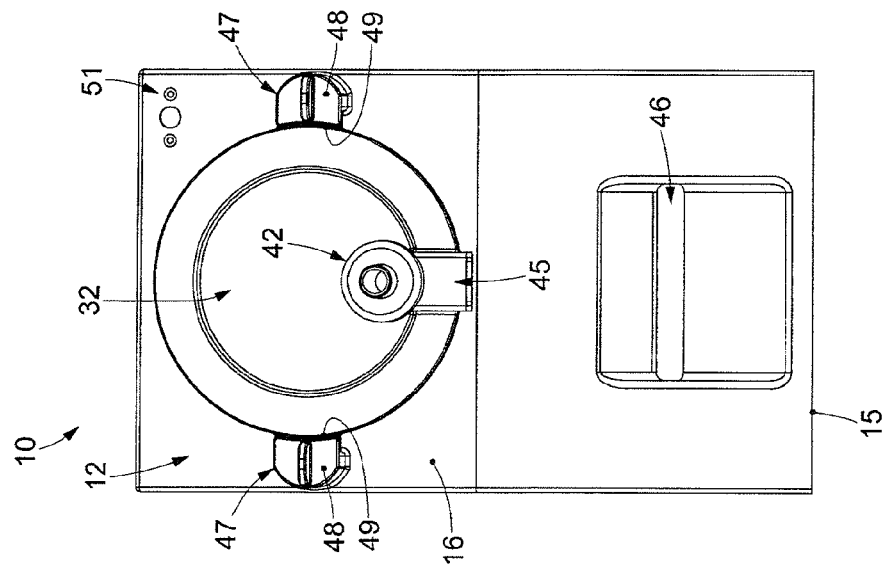
FIG. 2 is a schematic front view of the machine of FIG. 1.
Figure 1:
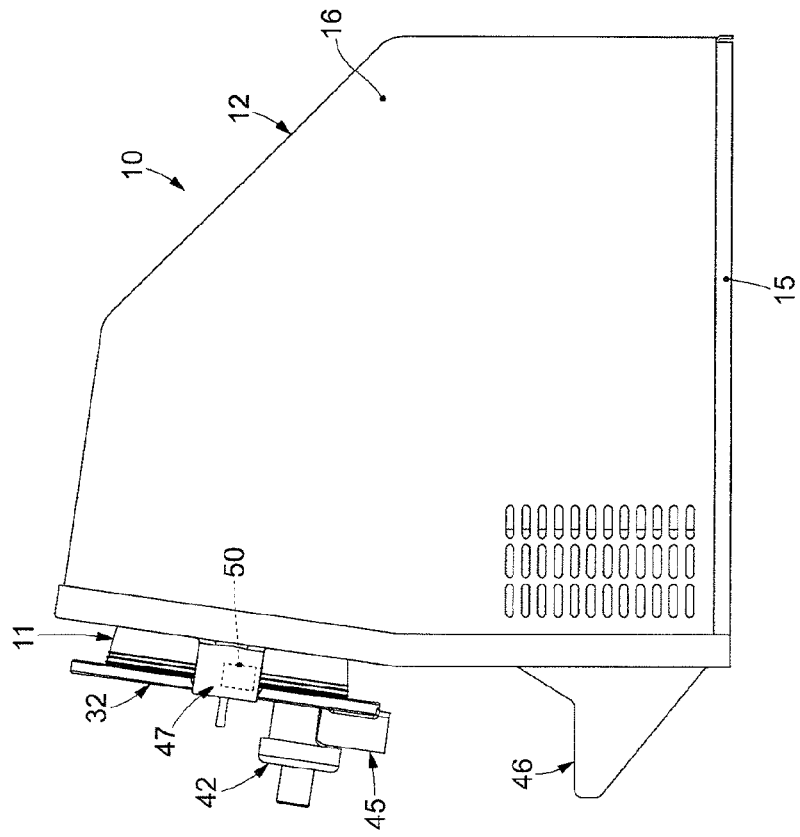
FIG. 1 is a schematic lateral view of a machine for the production of ice cream according to some embodiments of the invention.

Embodiments described here with reference to FIGS. 1-4 concern a machine 10 for the production of ice cream, preferably of a domestic or semi-professional type.

According to some embodiments, the machine 10 comprises a support body 12 internally hollow to define a housing seating 14 in which the components of the machine 10 can be housed.

The support body 12 can have a box-like, prismatic, cylindrical or conical shape, or a combination thereof.

According to some embodiments, the support body 12 can be made of heat-insulating material.

According to other embodiments, the support body 12 can be made of metal, for example with a metal sheet.

The support body 12 can comprise a bottom wall 15 defining a support base of the machine 10, and an external wall 16 which can substantially delimit its lateral and upper bulk.

According to some embodiments, the support body 12 is provided with a housing compartment 13, suitable to house a container, or tub 11, to contain the ingredients and the ice cream during its preparation.

The machine 10 also comprises a cooling circuit 20 disposed at least in part in the housing seating 14 and cooperating with the housing compartment 13 to cool the walls of the latter and therefore the mixture in the tub 11 disposed inside it.

The cooling circuit 20 can be, for example, a refrigerator machine which exploits, in a known way, the heat exchanges deriving from the phase changes of a heat transfer fluid.

The cooling circuit 20 can comprise a condenser 21, a compressor 22, an expansion member, not shown in the drawings, and an evaporator 23.

According to some embodiments, the evaporator 23 comprises a support casing 24 and a coiled pipe 25, inside which the heat transfer fluid can flow, wound around the support casing 24.

According to some embodiments, the support casing 24 itself defines at least part of the housing compartment 13, so as to be directly in contact with the walls of the tub 11 which have to be cooled.

According to possible solutions, the support casing 24 comprises an internal surface suitable to be in contact with a lateral wall 27 of the tub 11, and an external surface cooperating with the pipe 25.

According to some embodiments, the casing 24 is provided on the external surface with a groove, made in its thickness, in which the coils of the pipe 25 can be inserted so as to increase the contact surface between them and the support casing 24, and make the heat exchange more efficient.

According to some embodiments, the evaporator 23 can be of the type described in patent application n. 102018000003202 entitled "EVAPORATOR DEVICE AND MACHINE FOR THE PRODUCTION OF ICE CREAM", filed on Feb. 3, 2018 in the name of the Applicant.

According to some embodiments, the machine 10 for the production of ice cream also comprises a mixing device 18 disposed, during use, inside the tub 11, and configured to mix the ingredients during the ice cream preparation process.

According to some embodiments, the mixing device 18 is rotated around an axis of rotation X by a drive shaft 17 connected to a motor member 19. The mixing device 18, rotating, removes the mixture which is progressively cooled by the cold walls of the tub 11 and at the same time incorporates air into it in order to make it creamy.

According to some embodiments, the machine 10 also comprises a control and command unit, not shown, configured to at least adjust the functioning of the cooling circuit 20 and of the motor member 19 by modifying the respective parameters, for example temperature and rotation speed, as a function of the production requirements of the ice cream and the type of final product to be obtained.

According to possible solutions, the machine 10 can be provided with a user interface 51, connected to the control and command unit, by means of which a user can command the start and/or stop of the ice cream production process, or possibly input operating parameters such as time intervals, temperatures, rotation speed, or others.

The user interface 51 can also comprise luminous, for example LED (Light Emitting Diode) or sound signaling elements, suitable to provide a signal to the user on the progress or the end of the ice cream preparation process, or possible problems and malfunctions of the machine 10.

According to some embodiments, the housing compartment 13 has its own axis of longitudinal development coinciding with the axis of rotation X and a through hole is provided on its bottom surface through which the drive shaft 17 passes.

According to some embodiments, the tub 11 is removable and can be inserted into/extracted from the housing compartment 13 by simply translating it along the axis of rotation X.

According to some embodiments, the tub 11 comprises a bottom wall 26 and the lateral wall 27 extends from the bottom wall 26; the walls 26, 27 substantially define a chamber 28 to work and/or store the ice cream.

The upper edge of the lateral wall 27 opposite the bottom wall 26 defines an upper aperture 29 to access the chamber 28.

According to possible embodiments, the tub 11 can be provided with an annular portion 30 protruding radially from the upper aperture 29 toward the outside.

According to some embodiments, the tub 11 also comprises a tubular body 31, disposed along a central axis of its own which, during use, coincides with the axis of rotation X, and provided with through apertures in correspondence with each end through which the drive shaft 17 can pass during the insertion/removal of the tub 11 into/from the housing compartment 13.

According to some embodiments, the tub 11 and the housing compartment 13 have truncated cone shapes mating with each other, that is, the respective lateral walls have the same angle of flare β with respect to the axis of rotation (X).

In this way, in addition to guaranteeing a correct and easy reciprocal positioning of the tub 11 and the housing compartment 13, a good surface adhesion of the two components is guaranteed by a same shape coupling. Consequently, the heat exchange between the evaporator 23 and the tub 11 is improved, increasing the efficiency of the machine 10 and decreasing the time required to prepare the ice cream.

According to one aspect of the present invention, the machine 10 has a substantially horizontal axis of rotation X.

With the term "substantially horizontal" we mean that the axis of rotation X can have an inclination with respect to a horizontal plane π angle of inclination α of no more than 20°.

In particular, the angle of inclination α can be comprised between 0° and ±20°.

Figure 3:
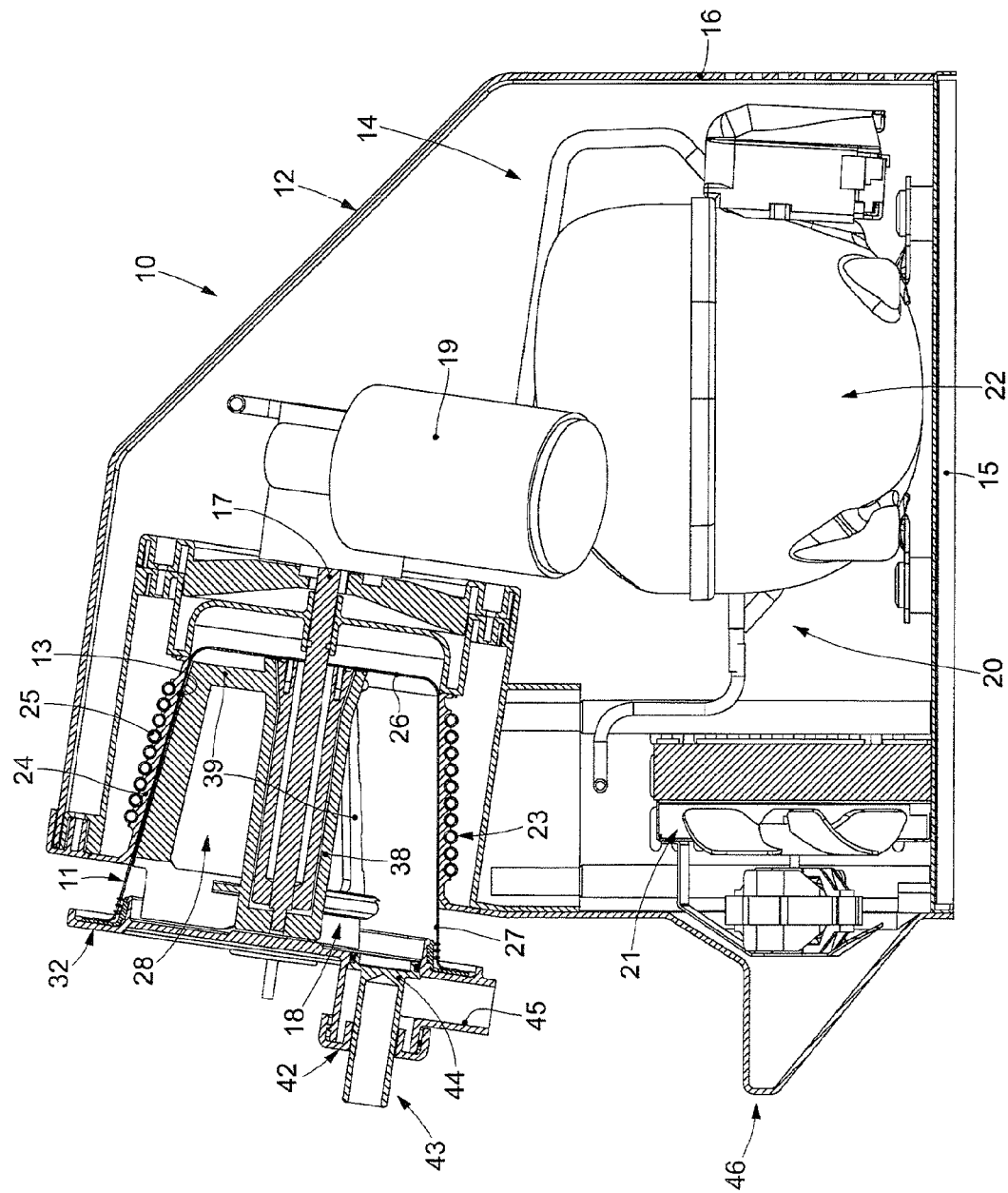
FIG. 3 is a schematic lateral section view of the machine of FIG. 1.
Figure 4:
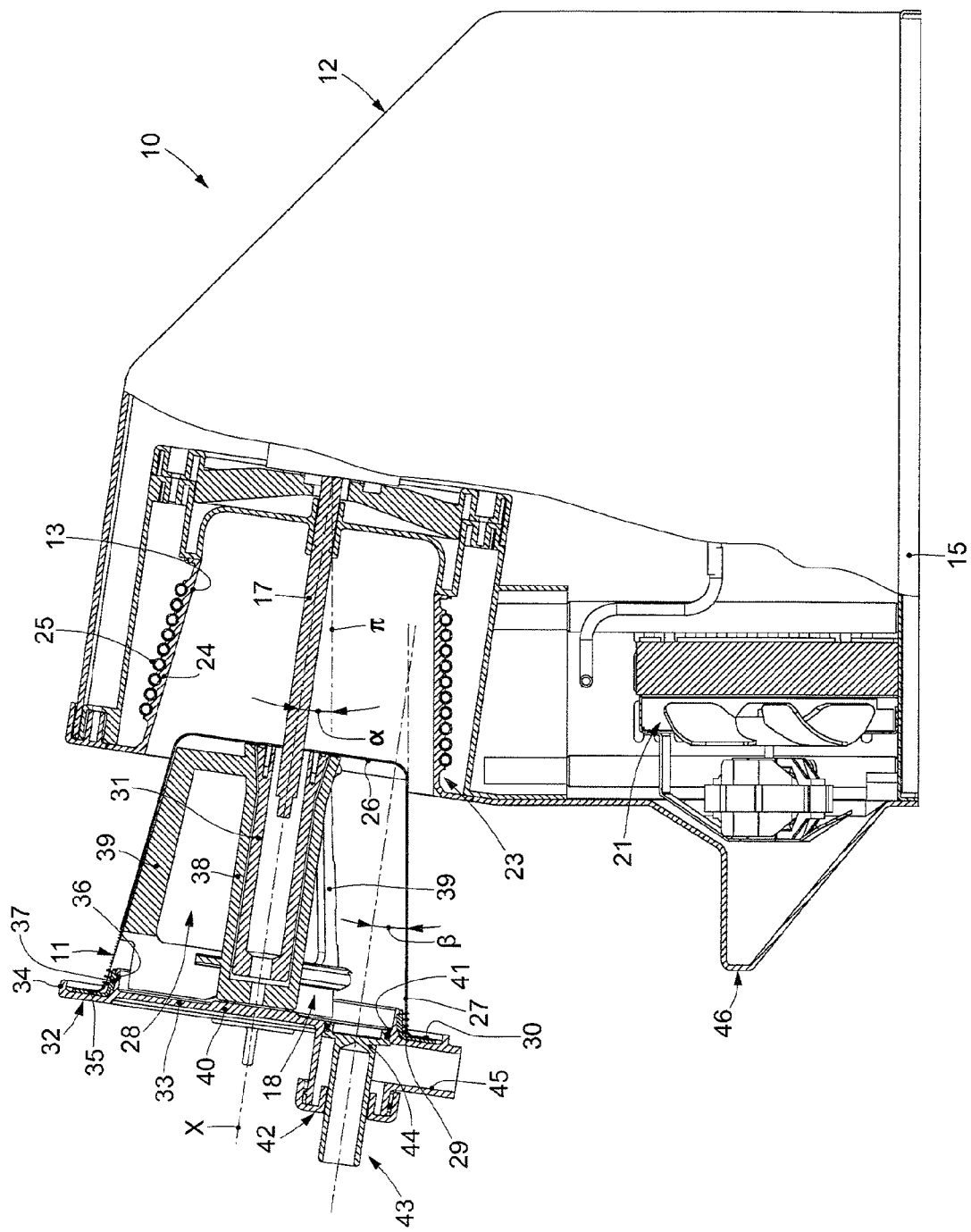
FIG. 4 is a schematic lateral section view of the machine of FIG. 1 with the container for the ingredients partially extracted.

According to some embodiments, described for example with reference to FIGS. 3 and 4, the angle of inclination α is positive with respect to the horizontal.

According to possible variant embodiments, not shown, the angle of inclination α is negative with respect to the horizontal.

According to variant embodiments, the central axis X is inclined at an angle of inclination α of about 7°-10° with respect to the horizontal.

According to further embodiments, the amplitude of the angle of inclination α substantially corresponds to the angle of flare β of the tub 11 and of the housing compartment 13 so that, during use, the lateral wall 27 of the tub 11 lies on a substantially horizontal plane.

In this way the ingredients, or the mixture which gradually forms, tend not to slide toward the bottom wall 26 or toward the upper aperture 29, and can therefore be mixed correctly and in a homogenous manner.

Providing a horizontal axis of rotation X increases the heat exchange between the ingredients and the evaporator 23, as the ingredients, due to the force of gravity, always remain in contact with a portion of the lateral wall 27 of the tub 11 and therefore with the evaporator 23.

According to some embodiments, the machine 10 comprises a closing element, or lid 32, configured to selectively close the upper aperture 29 of the tub 11.

According to some embodiments, the tub 11 can be inserted and removed from the housing compartment 13 with the lid 32 associated therewith, that is, the tub 11 and the lid 32 can be associated with each other to form a single entity defining a cartridge-type container.

According to some embodiments, the lid 32 can be associated with the tub 11 for example by interference, same shape coupling, or by screwing, or with bayonet systems, so as to make reciprocal coupling/decoupling simple and easy without needing to use tools of any kind.

In this way, it is possible to introduce the ingredients into the tub 11 away from the machine 10, close the tub 11 with the lid 32, and subsequently insert the already closed cartridge-type container in the housing compartment 13.

In this way, the machine 10, and in particular the support body 12, remain advantageously clean and are not dirtied either during the introduction of the ingredients or during the preparation and subsequent removal of the ice cream.

According to some embodiments, the lid 32 has a flat portion 33, suitable to rest on the annular portion 30 of the tub 11 to close the upper aperture 29. For this purpose, the flat portion 33 can have a surface extension greater than the upper aperture 29, preferably even greater than the extension of the annular portion 30.

According to possible solutions, the flat portion 33 comprises a shaped peripheral edge 34 which defines a housing seating 35 for the annular portion 30. In this way, the lid 32 covers the entire upper extension of the tub 11, guaranteeing the cleanliness of both the chamber 28 and also the aperture 29 and limiting if not preventing possible contaminations of the ingredients and/or of the ice cream present in the chamber 28.

According to further embodiments, the lid 30 comprises an annular protrusion 36, which extends from the face of the flat portion 33 disposed, during use, toward the tub 11, and is configured to be inserted into the upper aperture 29 thereof.

According to some embodiments, the annular protrusion 36 is slightly inclined with respect to the flat portion 33, presenting in its entirety a truncated cone shape, mating with the shape of the tub 11.

According to possible solutions, sealing elements 37, or gaskets, are provided disposed on the side of the annular protrusion 36 facing toward the outside, suitable to cooperate with the lateral wall 27 of the tub 11 in order to ensure a sealed closing of the chamber 28 and prevent possible unwanted spillages of the ingredients and/or ice cream from the latter.

According to some embodiments, the mixing device 18 comprises a central tubular portion 38 suitable to be inserted on the tubular body 31 of the tub 11, and one or more blades, or spatulas 39, which extend transversely from the central tubular body 31.

According to possible embodiments, the coupling of the mixing device 18 and the tub 11 is defined by the lid 32 itself, which, in the closed position, keeps the central tubular body 38 of the mixing device 18 constrained to the drive shaft 17.

According to possible embodiments, the flat portion 33 can comprise, in a central zone, a raised portion 40 suitable to interfere with one end of the central tubular body 38 so as to press it toward the bottom wall 26 of the container.

In this way, it is possible to constrain the mixing device 18 in the tub 11 in a stable manner, without needing to use screws or other attachment elements and, at the same time, without interfering with the spatulas 39 which can therefore have an extension that corresponds to the entire length of the lateral wall 27 in order to effectively remove the cooled mixture therefrom.

According to further embodiments, the machine 10 comprises clamping devices 47 configured to selectively clamp the tub 11 and the lid 32 associated therewith to the support body 12.

According to possible embodiments, the clamping devices 47 are disposed in proximity to the peripheral edge of the housing compartment 13 and are suitable to interfere with the lid 32 to prevent undesired movements of the latter and/or of the container in an axial direction along the axis of rotation X.

According to some embodiments, two or more clamping devices 47 can be provided angularly distanced from each other around the edge of the housing compartment 13.

According to some embodiments, the clamping devices 47 can comprise a constraint element 48 selectively mobile between a position of non-interference, in which it is distant from the lid 32 and allows the insertion and removal of the lid 32 and possibly of the tub 11, and a position of interference in which it is in contact with the lid 32 and prevents its removal.

According to some embodiments, the constraint elements 48 can be configured to interact with suitable flaps 49 provided in specific positions along the periphery of the lid 32 so as to guarantee a precise positioning and orientation of the latter with respect to the axis of rotation X.

According to further variant embodiments, the machine 10 can comprise switch devices 50, associated with the clamping devices 47, and configured to act on the motor 19 and stop the rotation of the mixing device 18 if the lid 32 is removed.

According to some embodiments, the switch devices 50 can comprise magnetic switches, proximity sensors, or other sensors and/or switches suitable to detect whether the constraint elements 48 are in a condition of interference with the lid 32 or not.

The switch devices 50 can act directly on the motor or send a signal to a control and command unit of the machine 10, not shown, which in turn can command the motor 19.

In this way, if a user wants to open the lid 32 when the machine 10 is functioning, the safety problems that can occur with the solutions of the state of the art are avoided.

According to further embodiments, the lid 32 can be provided with at least one through aperture 41 and a closing member 42 selectively drivable to open or close the through aperture 41.

According to some embodiments, the closing member 42 comprises a piston 43 provided with a closed end 44 suitable to close the through aperture 41.

The piston 43 is configured mobile along a longitudinal axis of its own between a closed position in which the closed end 44 is adjacent to, and closes the through aperture 41, and an open position in which it is distant from the through aperture 41.

According to some embodiments, the closing member 42 is also provided with a delivery channel 45 through which the prepared ice cream can be delivered into a container, for example a cup, a cone, or suchlike, already portioned and ready for consumption.

According to some embodiments, at least during the delivery of the ice cream, the through aperture 41 can be positioned in correspondence with a horizontal lying plane of the lateral wall 27 so that the delivery channel 45 faces downward.

In this way, thanks to the rotation of the mixing device 18, the prepared ice cream is progressively removed from the lateral wall 27 and pushed toward the through aperture 41, from which it can advance in the channel 45 also due to the force of gravity.

According to some embodiments, the delivery channel 45 can be selectively put in communication with the through aperture 41 when the piston 43 is moved to its open position.

According to some embodiments, the movement of the piston 43 and therefore the opening/closing of the delivery channel can occur manually.

According to variant embodiments, the movement of the piston 43 can occur automatically. In this case, movement means (not shown) can be provided connected to the piston 43 and drivable by a control and command unit of the machine 10, for example as a function of a command given by a user through the user interface 51. For this purpose, the machine 10 can comprise a support base 46, connected to or integrated in the support body 12, disposed below the aperture of the housing compartment 13, configured to support a container suitable to receive ice cream from the delivery channel 45.

It is clear that modifications and/or additions of parts may be made to the machine 10 for the preparation of ice cream as described heretofore, without departing from the field and scope of the present invention.

It is also clear that, although the present invention has been described with reference to some specific examples, a person of skill in the art shall certainly be able to achieve many other equivalent forms of machine 10 for the preparation of ice cream, having the characteristics as set forth in the claims and hence all coming within the field of protection defined thereby.

The invention claimed is:

1. A machine for the production of ice cream, comprising:
a support body defining a housing compartment with an axis of development substantially horizontal or inclined at an angle of inclination of no more than 20° with respect to a horizontal plane;
a tub configured to contain the ingredients for the preparation of the ice cream which can be removably inserted in said housing compartment;
a cooling circuit configured to cool at least part of said housing compartment and said tub disposed in the latter;
a mixing device disposed, during use, inside said tub and configured to mix the ingredients during the preparation of the ice cream;
a lid configured to selectively close an upper aperture of said tub; and
clamping devices provided on said support body and configured to selectively clamp said lid and said tub in said housing compartment; and
wherein said tub comprises a central tubular body provided with through apertures in correspondence with each end through which a drive shaft can pass, configured to make said mixing device rotate, wherein the coupling between said drive shaft and said mixing device is defined by said lid and said clamping devices.

2. The machine as in claim 1, wherein said angle of inclination is positive with respect to the horizontal plane and comprised between 0° and 20°.

3. The machine as in claim 1, wherein said housing compartment and said tub have truncated cone shapes mating with each other, having the same angle of flare with respect to said axis of development.

4. The machine as in claim 3, wherein the amplitude of said angle of inclination corresponds to the angle of flare of said tub and of said housing compartment.

5. The machine as in claim 1, wherein said lid is provided with at least one through aperture through which the ice cream produced can be delivered, and with a closing member selectively drivable to open or close the through aperture.

6. The machine as in claim 1, wherein said clamping devices comprise a constraint element selectively mobile between a position of non-interference, in which it is distant from said lid and allows the insertion and removal of said lid and possibly of said tub, and a position of interference in which it is in contact with said lid and prevents its removal.

7. The machine as in claim 6, wherein said constraint elements are configured to interact with suitable flaps provided in specific positions along the periphery of said lid so as to guarantee a precise positioning and orientation of the lid with respect to said axis of development.

8. The machine as in claim 7, wherein said switch devices comprise at least one of either magnetic switches, proximity sensors, or other sensors and/or switches suitable to detect if said constraint elements are in a condition of interference with said lid or not.

9. A machine for the production of ice cream, comprising:
a support body defining a housing compartment with an axis of development substantially horizontal or inclined at an angle of inclination of no more than 20° with respect to a horizontal plane;
a tub configured to contain the ingredients for the preparation of the ice cream which can be removably inserted in said housing compartment;
a cooling circuit configured to cool at least part of said housing compartment and said tub disposed in the latter;
a mixing device disposed, during use, inside said tub and configured to mix the ingredients during the preparation of the ice cream;
a lid configured to selectively close an upper aperture of said tub; and
clamping devices provided on said support body and configured to selectively clamp said lid and said tub in said housing compartment; and
further comprising switch devices, associated with said clamping devices and configured to act on a motor member connected to said mixing device to stop the rotation thereof if the lid is removed.

10. The machine as in claim 9, wherein said angle of inclination is positive with respect to the horizontal plane and comprised between 0° and 20°.

11. The machine as in claim 9, wherein said housing compartment and said tub have truncated cone shapes mating with each other, having the same angle of flare with respect to said axis of development.

12. The machine as in claim 11, wherein the amplitude of said angle of inclination corresponds to the angle of flare of said tub and of said housing compartment.

13. The machine as in claim 9, wherein said lid is provided with at least one through aperture through which the ice cream produced can be delivered, and with a closing member selectively drivable to open or close the through aperture.

14. The machine as in claim 9, wherein said clamping devices comprise a constraint element selectively mobile between a position of non-interference, in which it is distant from said lid and allows the insertion and removal of said lid and possibly of said tub, and a position of interference in which it is in contact with said lid and prevents its removal.

15. The machine as in claim 14, wherein said constraint elements are configured to interact with suitable flaps provided in specific positions along the periphery of said lid so as to guarantee a precise positioning and orientation of the lid with respect to said axis of development.

16. The machine as in claim 15, wherein said switch devices comprise at least one of either magnetic switches, proximity sensors, or other sensors and/or switches suitable to detect if said constraint elements are in a condition of interference with said lid or not.

17. The machine as in claim 9, wherein said tub comprises a central tubular body provided with through apertures in correspondence with each end through which a drive shaft can pass, configured to make said mixing device rotate, wherein the coupling between said drive shaft and said mixing device is defined by said lid and said clamping devices.

* * * * *